United States Patent [19]

Meyer et al.

[11] Patent Number: 5,600,895

[45] Date of Patent: Feb. 11, 1997

[54] EXTENSOMETER

[75] Inventors: Richard A. Meyer, Carver; Scott P. Iverslie, Chanhassen, both of Minn.

[73] Assignee: MTS Systems Corporation, Eden Prairie, Minn.

[21] Appl. No.: 615,794

[22] Filed: Mar. 14, 1996

Related U.S. Application Data

[63] Continuation of Ser. No. 310,854, Sep. 22, 1994, abandoned.

[51] Int. Cl.⁶ .............................. G01B 5/30; G01B 7/16
[52] U.S. Cl. .............................................. 33/789; 33/790
[58] Field of Search ........................... 33/787, 788, 789, 33/790; 73/841, 846, 853

[56] References Cited

U.S. PATENT DOCUMENTS

| | | | |
|---|---|---|---|
| 2,099,896 | 11/1937 | Kinsel | 33/148 |
| 2,663,085 | 12/1953 | Ruge | 33/147 |
| 2,917,920 | 12/1959 | Robinette, Jr. et al. | 73/95 |
| 3,319,338 | 5/1967 | De Nicola | 33/148 |
| 3,729,985 | 5/1973 | Sikora | 33/787 |
| 3,789,508 | 2/1974 | Meline | 33/788 |
| 4,223,443 | 9/1980 | Bachmann et al. | 33/148 D |
| 4,249,417 | 2/1981 | Feldstein et al. | 73/141 A |
| 4,294,015 | 10/1981 | Drouin et al. | 33/174 D |
| 4,607,531 | 8/1986 | Meline et al. | 73/794 |
| 4,823,473 | 4/1989 | McMahon | 33/787 |
| 4,841,226 | 6/1989 | Meline et al. | 33/788 X |
| 4,939,445 | 7/1990 | Meline et al. | 324/663 |
| 5,123,175 | 6/1992 | van der Kuur | 33/789 |

OTHER PUBLICATIONS

Product Specification, "Series 632.05 Clip–On Displacement Gages", MTS Systems Corporation, 1989, pp. 1–8 No Month.

*Primary Examiner*—Thomas B. Will
*Attorney, Agent, or Firm*—Westman, Champlin & Kelly, P.A.

[57] ABSTRACT

An extensometer measures strain on a test specimen subjected to tensile, compression or fatigue tests. The extensometer has a pair of members that are connected together preferably with at least two spaced-apart flexible plates. The members are coupled to move with the specimen when the specimen is subjected to the foregoing tests. A measuring device measures a change in distance of the members relative to each other in order to measure elongation or compression of the test specimen.

21 Claims, 8 Drawing Sheets

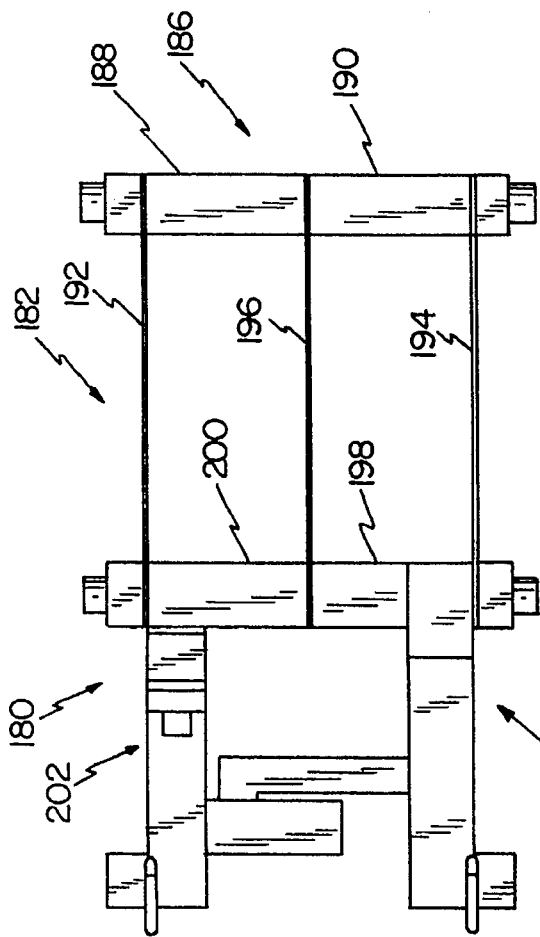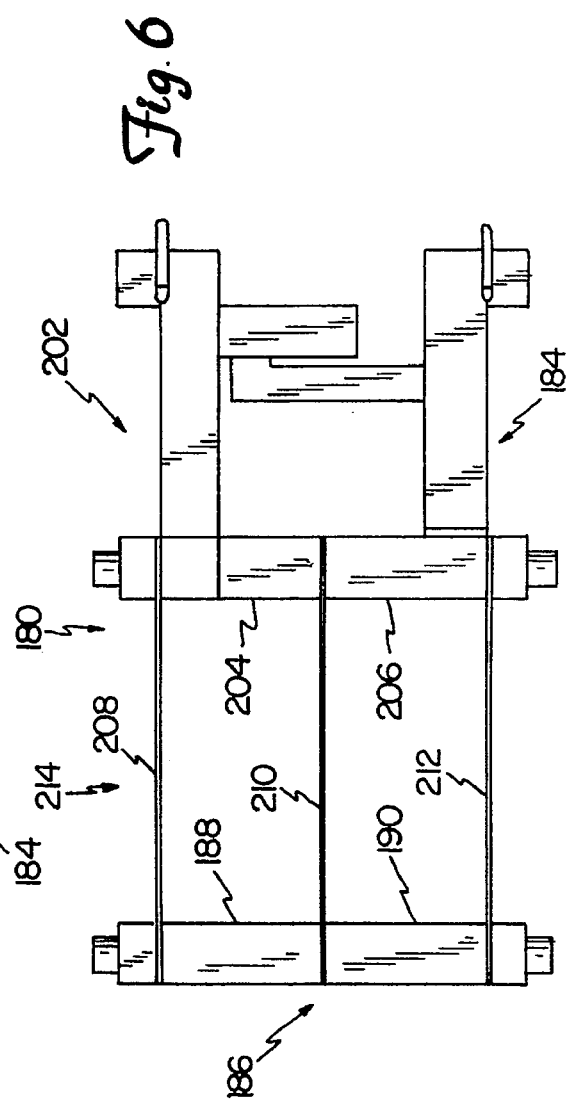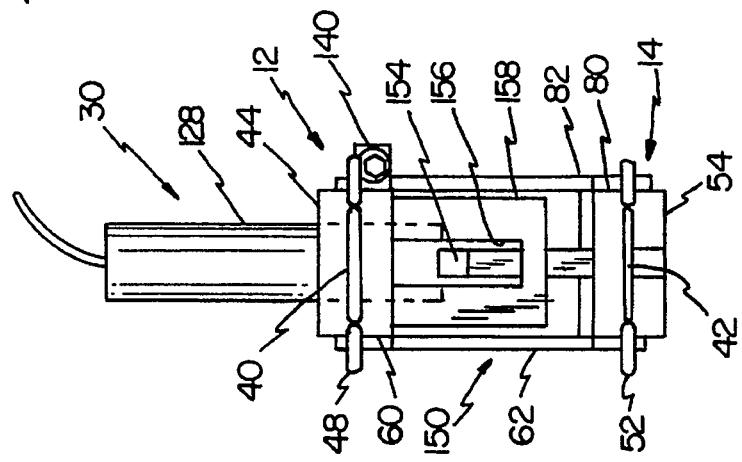

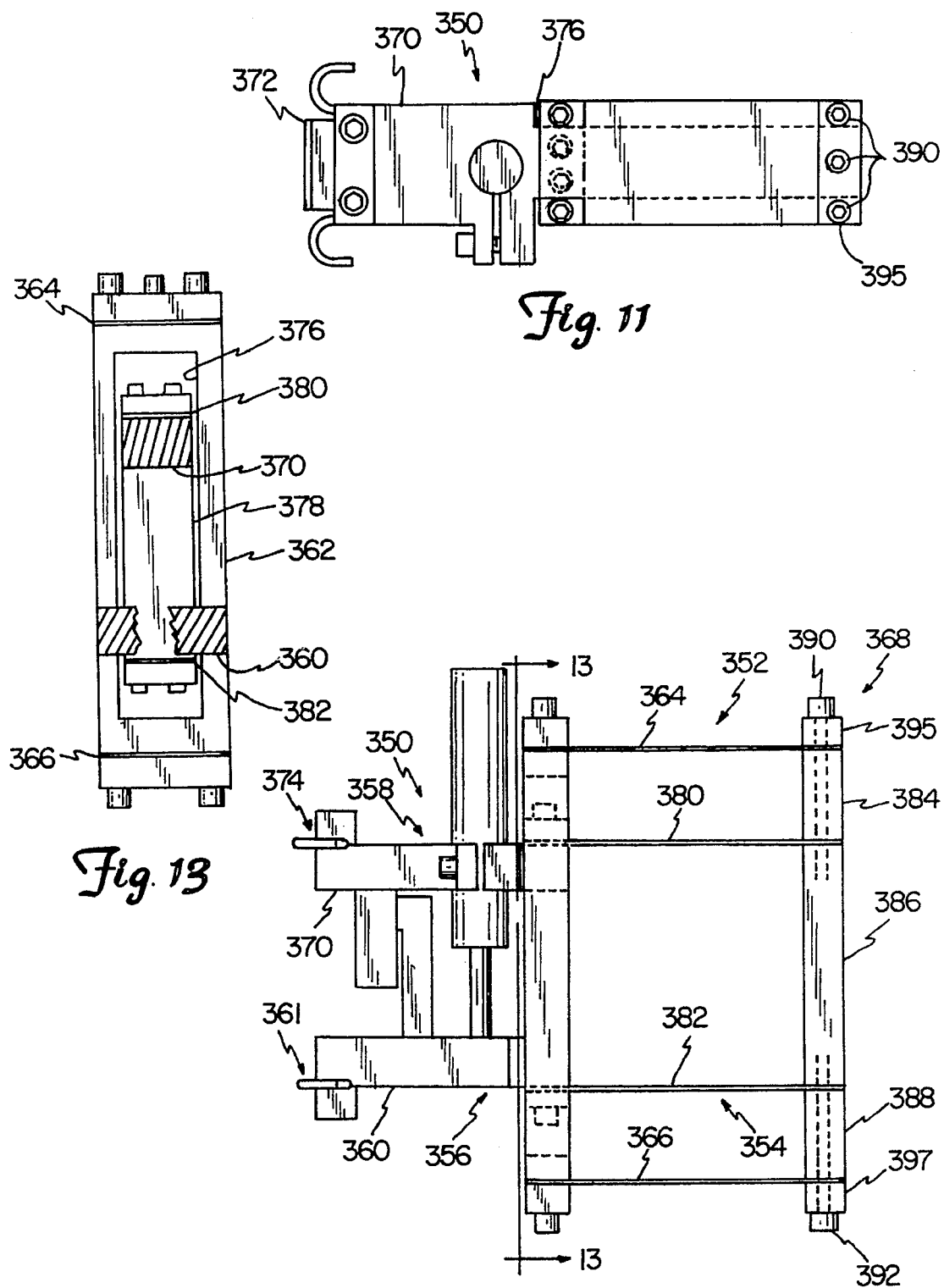

EXTENSOMETER

This is a continuation of application Ser. No. 08/310,854, filed Sep. 22, 1994 now abandoned.

BACKGROUND OF THE INVENTION

The present invention relates to an extensometer that measures a change in distance. More particularly, the present invention relates to an extensometer having an improved flexure assembly.

Extensometers are commonly used for measuring strain in a test specimen. Numerous forms of extensometers have been advanced in the art. One common form includes an extensometer having a pair of arms with first ends of the arms contacting surfaces of the specimen to be tested. At ends opposite the test specimen, the arms are mounted together with a flexure assembly comprising a first flexure plate or member and a second flexure plate or member. The flexure plates are joined together to form a hinge assembly with each flexure plate substantially perpendicular to the other. With elongation or compression of the test specimen, the arms move in an arc since the arms are hinged at the flexure assembly.

Although the above-described extensometer is well suited for many applications, the extensometer is not easily adaptable to be used with displacement sensors such as an LVDT (linear variable differential transformer) sensor. As is known, the LVDT sensor typically comprises an inner rod assembly that moves longitudinally through an aperture of an outer housing. Since the arms of the above-described extensometer travel in an arc, the LVDT sensor cannot be mounted to the extensometer because the inner rod assembly will contact a perimeter wall of the aperture or components located in the outer housing.

SUMMARY OF THE INVENTION

An extensometer measures strain on a test specimen subjected to tensile, compression or fatigue tests. The extensometer has a pair of members that are connected together preferably with at least two spaced-apart flexible plates. The members are coupled to move with the specimen when the specimen is subjected to the foregoing tests. A measuring device measures a change in distance of the members relative to each other in order to measure elongation or compression of the test specimen.

In a first embodiment, the extensometer includes a support member joined to each of the members through independent flexure assemblies. Each flexure assembly comprises two spaced-apart flexible plates. As a distance between members changes due to elongation or compression of the test specimen, the members move away from or toward each other. At the same time, the support member moves either moves toward or away the test specimen, depending on whether the test specimen is stretched or compressed, respectively. The flexible plates essentially operate as mechanical linkages in order to allow contact points of the members to travel in a plane. Since the contact points are moving in the same plane, the members remain aligned with each other. An LVDT sensor is mounted to each of the members to measure the change in distance therebetween.

BRIEF DESCRIPTION OF THE DRAWINGS

FIG. 4 is a front elevational view of the first embodiment;

FIG. 5 is a side elevational view of a second embodiment of the present invention;

FIG. 6 is an opposite side elevational view of the second embodiment;

FIG. 11 is a top plan view of a fifth embodiment of the present invention;

FIG. 12 is a side elevational view of the fifth embodiment;

FIG. 13 is a sectional view taken along lines 13—13 of FIG. 12 with parts broken away;

DETAILED DESCRIPTION OF THE PREFERRED EMBODIMENTS

Figure 1:
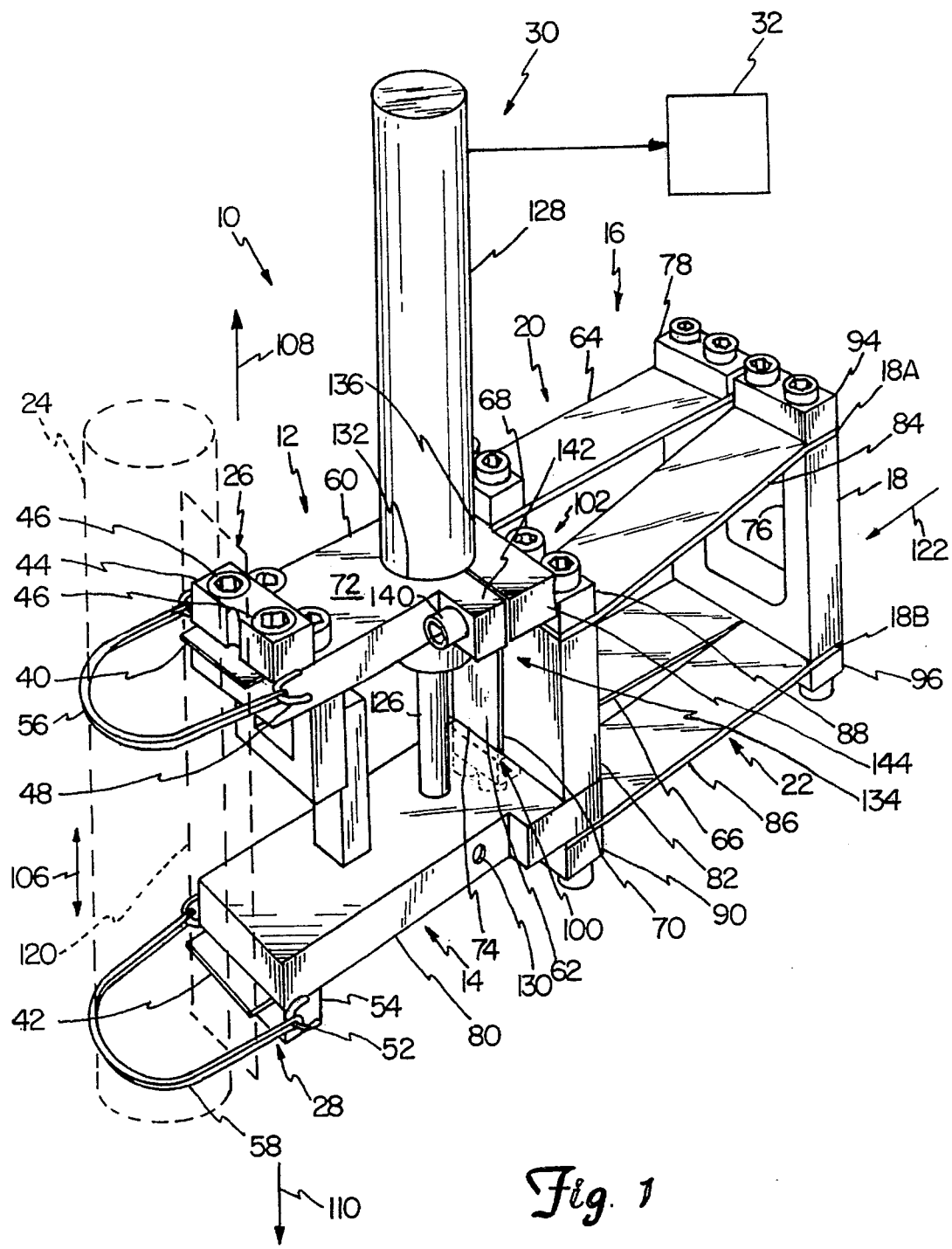
FIG. 1 is a perspective view of a first embodiment of an extensometer of the present invention.

A first embodiment of an extensometer of the present invention is illustrated in FIG. 1 at 10. The extensometer 10 includes an upper arm assembly 12 and a lower arm assembly 14 connected together by a flexure mechanism 16. As illustrated, the flexure mechanism 16 includes a support member 18 with two independent flexure assemblies 20 and 22 joining the support member 18 to each of the arm assemblies 12 and 14, respectively. The flexure assemblies 20 and 22 allow the arm assemblies 12 and 14 to move in response to compression or elongation of a test specimen 24. Specifically, the arm assemblies 12 and 14 have ends 26 and 28, respectively, that engage a surface of the test specimen 24. A sensing device 30, herein illustrated as an LVDT sensor, provides a signal representative of the change in distance between the ends 26 and 28 to a suitable display or recorder 32.

Figure 2:
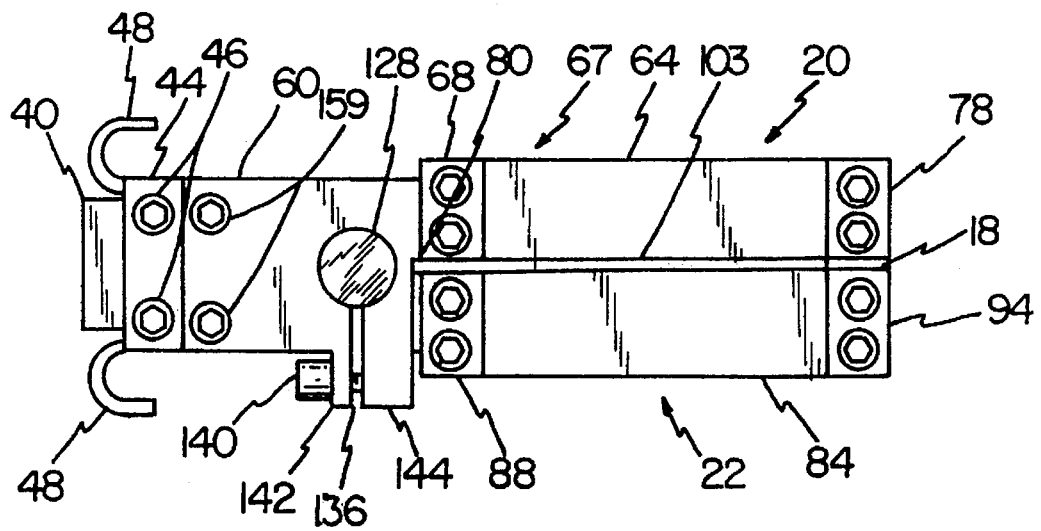
FIG. 2 is a top plan view of the first embodiment.

Referring also to FIG. 2, the arm assemblies 12 and 14 each carry a knife-edge blade 40 and 42, respectively. The knife-edge blade 40 attaches to the arm assembly 12 with a clamping block 44 that is fastened in place with suitable fasteners 46. The clamping block 44 also clamps a small wire clip 48 that is used for attaching the extensometer 10 to the test specimen 24. Similarly, the knife-edge blade 42 and a wire clip 52 are held in place on the arm assembly 14 with a clamping block 54 using suitable fasteners. The knife-edge blades 40 and 42 are held in engagement with the specimen through the use of elastic members, herein illustrated as rubber bands 56 and 58, respectively, but which also can be suitable coil springs. The elastic bands 56 and 58 urge the knife-edge blades 40 and 42 against the test specimen 24. The arm assemblies 12 and 14 are thus secured to the test specimen 24 so that when the test specimen 24 is loaded, the arm assemblies 12 and 14 will move with portions of the test specimen 24 either toward or away from each other.

Figure 3:
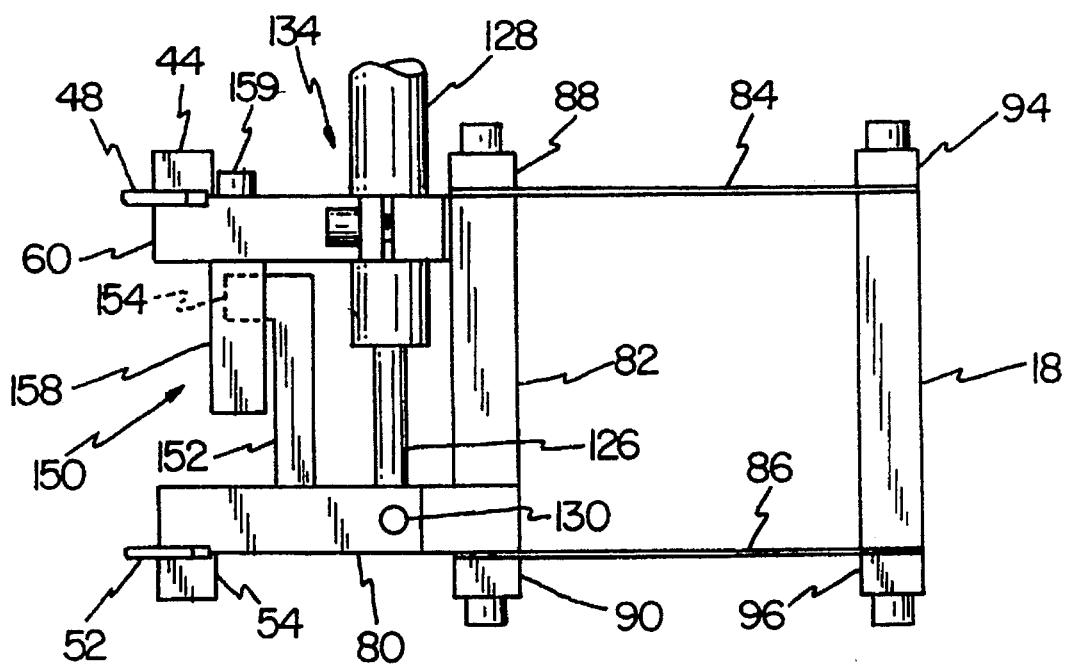
FIG. 3 is a side elevational view of the first embodiment with parts broken away.

Referring also to FIG. 3, the upper arm assembly 12 includes an extending portion 60 to which the knife-edge blade 40 is attached at end 26, as described above. The upper arm assembly 12 further includes a second portion 62 (FIG. 1) extending generally perpendicular to the first portion 60. Preferably, the portion 60 and the portion 62 are formed from a single unitary piece, but can be formed from separate pieces that are suitably joined together.

As stated above, the flexure assembly 20 joins the upper arm assembly 12 to the support member 18. In the embodiment illustrated, the flexure assembly 20 comprises two spaced-apart flexible plates 64 and 66. The flexible plates 64 and 66 are connected to the upper arm assembly 12 on an end 67 remote from the knife-edge blade 40. As illustrated, the flexible plates 64 and 66 are fastened with clamping blocks 68 and 70 and suitable fasteners to an upper surface 72 on the portion 60 and an end surface 74 of the portion 62. The flexible plates 64 and 66 are joined to opposite end surfaces 18A and 18B of the support member 18 also using suitable clamping blocks, one of which is illustrated in FIG. 1 at 78. The support member 18 is a solid block having an aperture 76 to reduce mass.

The lower arm assembly 14 is similar to the upper arm assembly 12 having a base portion 80 for mounting the knife-edge blade 42. A second portion 82 extends toward the upper arm assembly 12. Spaced-apart flexible plates 84 and 86 are joined to the lower arm assembly 14 using clamping blocks 88 and 90 and suitable fasteners as described above with respect to the upper arm assembly 12. Similarly, remote ends of the flexible plates 84 and 86 are joined to the block 18 on end surfaces 18A and 18B with suitable clamping blocks 94 and 96. It should be noted that the lower arm assembly 14 includes a recess or notch 100 of sufficient depth to allow the clamping block 68 and the portion 62 of the upper arm assembly 12 to pass by with no contact thereto. Similarly, the upper arm assembly 12 has a recess or a notch 102 that allows the clamping block 88 and the second portion 82 of the lower arm assembly 14 to pass adjacent the upper arm assembly 12 without contact. The flexible plates 64 and 66 are separated from the flexible plates 84 and 86 by a suitable gap indicated at 103 in FIG. 2.

In operation, when the test specimen 24 is subjected to loads that cause portions of the test specimen engaged by the knife-edged blades 40 and 42 to move away from each other as illustrated by double arrow 106, for example, the upper arm assembly 12 moves in the direction indicated by arrow 108, while the lower arm assembly 14 moves in the direction indicated by arrow 110. More importantly, the flexure mechanisms 20 and 22 connected to each arm assembly 12 and 14 allow the arm assemblies 12 and 14 to move away from each other while keeping ends of the knife-blades 40 and 42 generally in a plane 120. In other words, since the arm assemblies 12 and 14 are connected to the support member 18 through the parallel flexible plates 64, 66, 84 and 86, which essentially function as mechanical linkages, movement of the arm assemblies 12 and 14 away from each other causes the support member 18 to move toward the test specimen in the direction indicated by arrow 122. Unlike prior art extensometers that have arm assemblies which pivot from a common hinge point and, thus, travel in an arc, the extensometer 10 has arm assemblies 12 and 14 that have reference planes that remain parallel to each other at all times.

Keeping the arm assemblies 12 and 14 parallel to each other during displacement toward or away from each other is necessary if a high precision sensor such as the LVDT sensor 30 is to be effectively used. As illustrated, the LVDT sensor 30 includes an inner rod assembly 126 that moves relative to an outer housing 128. The inner rod assembly 126 is pinned to the lower arm assembly 14 using a cross-pin indicated at 130. The outer housing 128 is fastened to the upper arm assembly 12 to move therewith. Preferably, the outer housing 128 is located in an aperture 132 of the upper arm assembly 12. A clamping mechanism 134 is formed in the upper arm assembly 12 with a slot 136 extending from an edge of the portion 60 toward and to the aperture 132. A suitable bolt 140 extending through a portion 142 and threaded into a portion 144 secures the upper arm assembly 12 to the outer housing 128. With the cross-pin 130 also easily removed, the sensor 30 can be replaced as necessary, depending on the resolution or travel required. As stated above, the flexure mechanisms 20 and 22 allow parallel movement of the arm assemblies 12 and 14 away from and toward each other with no arc. Since the arm assemblies 12 and 14 are not traversing an arc, the rod assembly 126 and the outer housing 128 remain aligned with each other.

Referring to FIGS. 3 and 4, an over-travel stop mechanism 150 is provided to limit displacement of the arm assemblies 12 and 14 toward or away from each other. As illustrated, the over-travel stop mechanism 150 includes a stop lug 152 projecting from the lower arm assembly 14 being fastened thereto with a suitable fastener. The stop lug 152 includes a projecting portion 154 that extends into a center opening 156 formed by a U-shaped member 158. The U-shaped member 158 is secured in place on the upper arm assembly 12 with suitable fasteners 159.

A second embodiment of an extensometer of the present invention is illustrated in FIGS. 5 and 6 at 180. The extensometer 180 is similar to the extensometer 10 described above having two side-by-side flexure assemblies like flexure assemblies 20 and 22. However, in this embodiment, each flexure assembly includes three spaced-apart flexible plates. In FIG. 5, one of the flexure assemblies is illustrated at 182. The flexure assembly 182 connects a lower arm assembly 184 to a support member indicated at 186. The support member 186 includes two blocks at 188 and 190. Flexible plates 192 and 194 are similar to that of the embodiment described above. A third flexible plate 196 is fastened between the blocks 188 and 190 and to the lower arm assembly 184 between block portions 198 and 200.

As illustrated in FIG. 6, an upper arm assembly 202 also includes two block portions 204 and 206. Three spaced-apart flexible plates 208, 210 and 212 form a second flexure assembly 214 and connect the upper arm assembly 202 to the support member 186. Multiple flexible plates enables the spring constant of the flexure assemblies 182 and 214 to be adjusted so that any oscillatory displacement of the support member 186 does not interfere with testing of the test specimen. If desired, additional flexible plates in each of the flexure assemblies 182 and 214 can be added.

Figure 7:
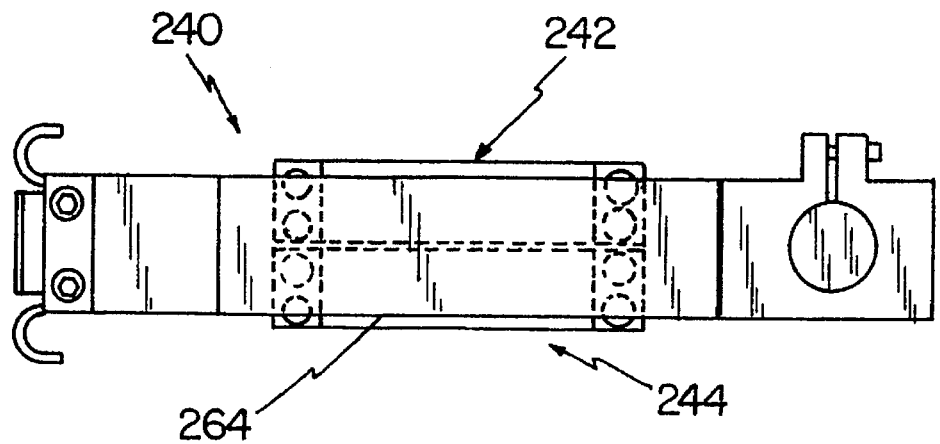
FIG. 7 is a top plan view of a third embodiment of the present invention.
Figure 8:
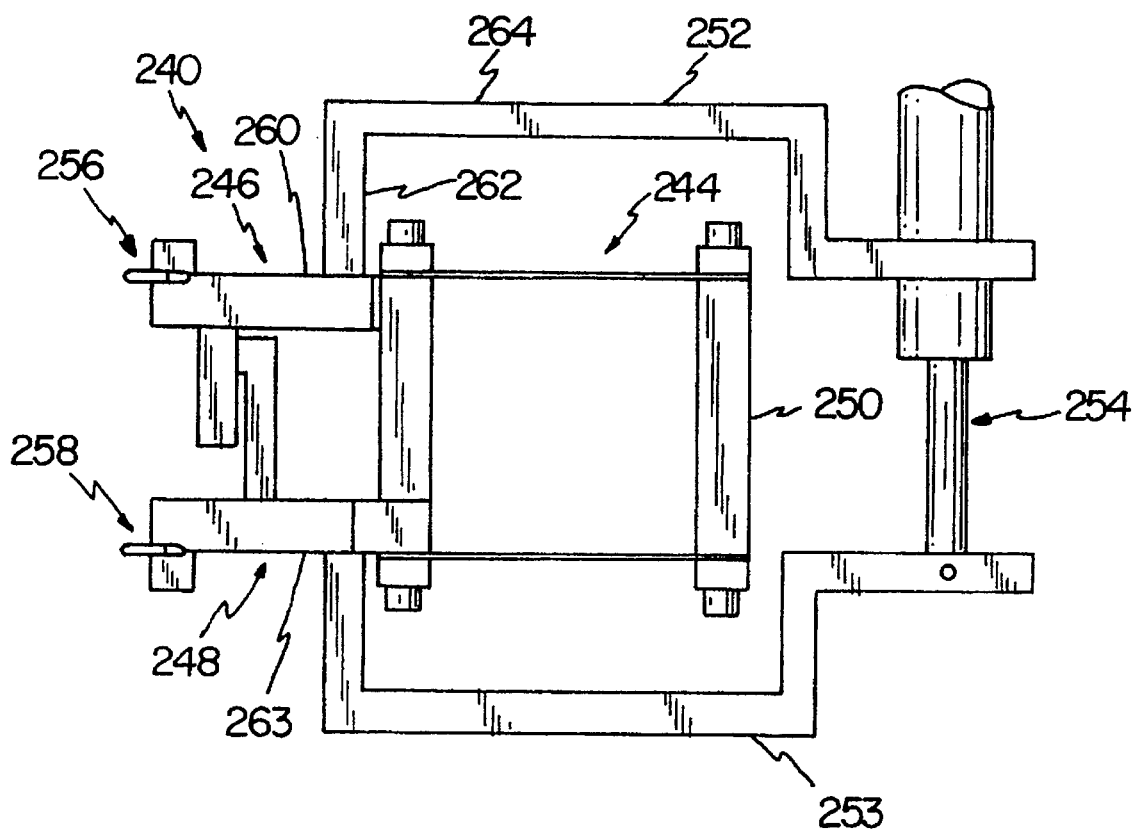
FIG. 8 is a side elevational view of the third embodiment with parts broken away.

FIGS. 7 and 8 illustrate a third embodiment of an extensometer of the present invention at 240. The extensometer 240 is substantially similar to the extensometer illustrated in FIGS. 1–5 wherein side-by-side flexure mechanisms 242 and 244 are used to join arm assemblies 246 and 248, respectively, to a support member 250. The extensometer 240 includes arm extensions 252 and 253 joined to arm assemblies 246 and 248, respectively. The arm extensions 252 and 253 are used to mount a displacement sensor 254, herein illustrated as a LVDT sensor, away from ends 256 and 258 and, thus, a test specimen, not shown. In this manner, the sensor 254 is located away from the test specimen so that heat or cold commonly applied to the test specimen does not damage the sensor 254.

As illustrated, the arm extension 252 is fastened to a first portion 260 of the upper arm assembly 246 with a first portion 262 generally perpendicular thereto. A second portion 264 extends over the flexure assemblies 242 and 244. At an end opposite the portion 262, the sensor 254 is mounted. The lower arm extension 253 is similar to the upper arm extension 252 and is fastened to a portion 263 of the lower arm assembly 248.

Figure 9:
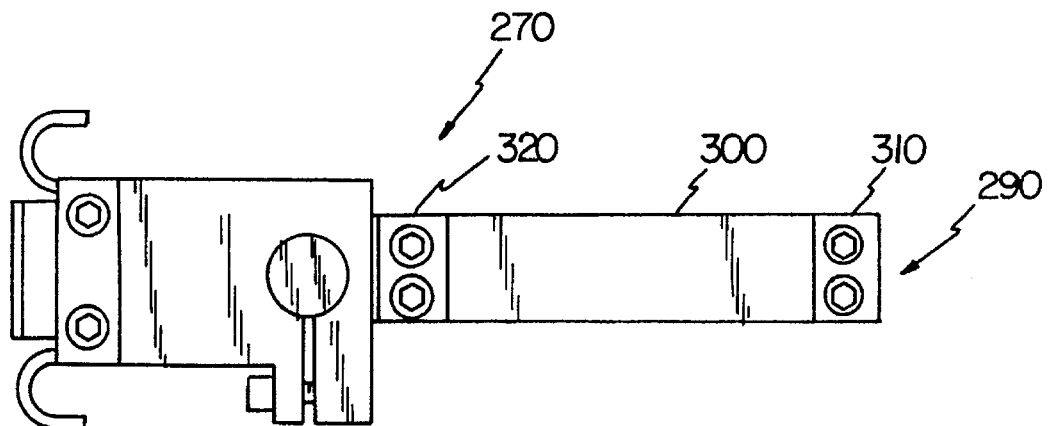
FIG. 9 is a top plan view of a fourth embodiment of the present invention.
Figure 10:
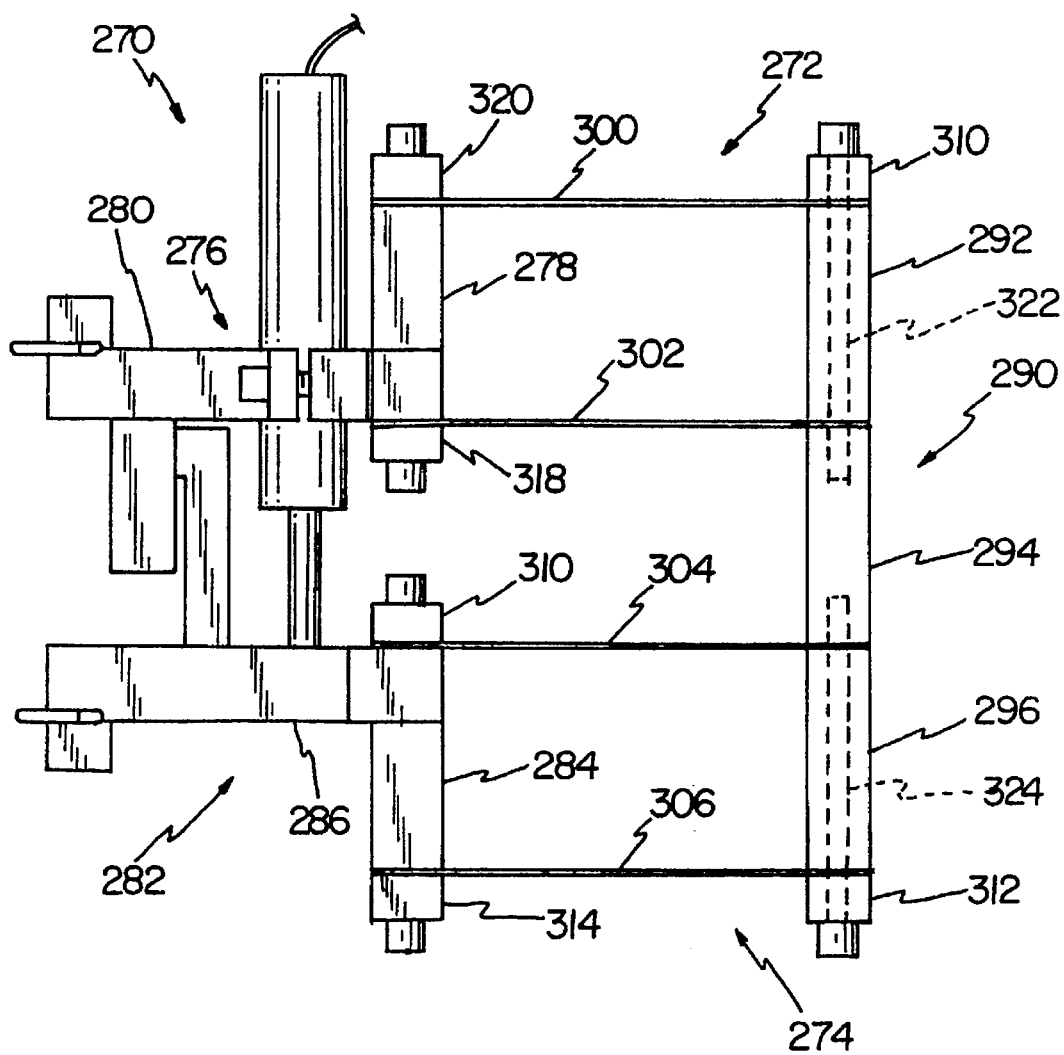
FIG. 10 is a side elevational view of the fourth embodiment.

FIGS. 9 and 10 illustrate a fourth embodiment of an extensometer of the present invention at 270. As illustrated, the extensometer 270 includes two stacked flexure assemblies 272 and 274 rather than the side-by-side parallel flexure assemblies as described above. In this embodiment, an upper arm assembly 276 includes an upstanding portion 278 that extends from a portion 280 and away from a lower arm assembly 282. Similarly, the lower assembly 282 has a portion 284 that extends from a portion 286 and away from the upper arm assembly 276.

A support member 290 is formed from blocks 292, 294 and 296. Flexible plates 300 and 302 mounted on opposite sides of block 292 join the upper arm assembly 276 to the support member 290. Similarly, flexible plates 304 and 306 mounted on opposite sides of block 296 join the lower assembly 282 to the support member 290. Clamping blocks 310, 312, 314, 316, 318 and 320 clamp the flexible plates to the corresponding arm assemblies 276 and 282 and blocks 292 and 296. As illustrated, fasteners 322 and 324 are of sufficient length to extend through the clamping blocks 310 and 312, respectively, and the blocks 292 and 296, respectively, to engage the center block 294.

FIGS. 11, 12 and 13 illustrate another embodiment of an extensometer of the present invention at 350. In this embodiment, flexure assemblies 352 and 354 are nested within each other wherein the outer flexure assembly 352 is joined to a lower arm assembly 356 and the inner flexure assembly 354 is joined to an upper arm assembly 358.

The lower arm assembly 356 includes a portion 360 to which a knife-edge blade is mounted at 361. Referring to FIG. 13, a second portion 362 is secured to the portion 360 and extends above and below the portion 360. Flexible plates 364 and 366 of outer flexure assembly 352 join the portion 362 to a support member indicated at 368.

The upper arm assembly 358 includes a portion 370 to which a knife-edge blade 372 is attached at end 374. At an end opposite the knife-edge blade 372, the portion 370 extends through a slot or aperture 376 formed in the portion 362 and is joined to a downwardly extending portion 378. Flexible plates 380 and 382 join the upper arm assembly 358 to the support member 368.

As illustrated, the support member 368 is formed from blocks 384, 386 and 388. Fasteners 390 and 392 are of sufficient length to extend through suitable clamping blocks 395 and 397, respectively, and blocks 384 and 388, respectively, to engage the center block 386. As illustrated, the flexible plates 364 and 366 are wider than the flexible plates 380 and 382; however, if desired, each flexible plate can be of the same width.

Figure 14:
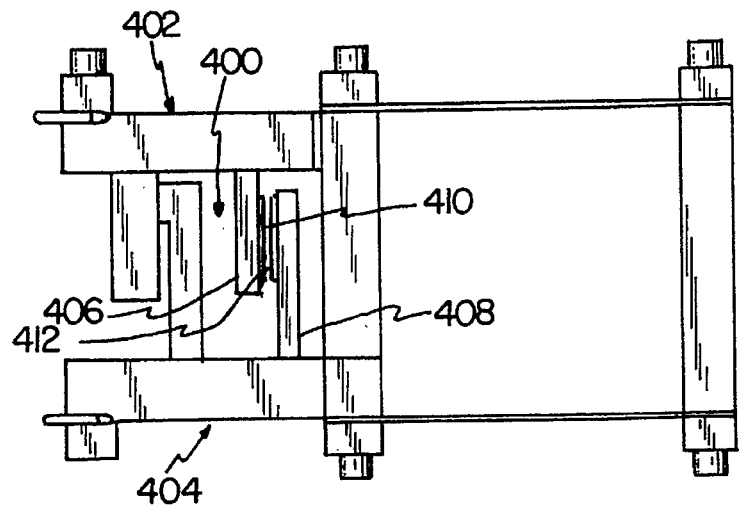
FIG. 14 is a side elevational view of a sixth embodiment in the present invention.

Although illustrated in the previous embodiments with a sensor comprising an LVDT sensor, other types of sensors can also be used. In FIG. 14, a capacitive sensor 400 is provided between an upper arm assembly 402 and a lower arm assembly 404. The capacitive sensor 400 includes a first support 406 joined to the upper arm assembly 402 and a second support 408 joined to the lower arm assembly 404. Each support incudes capacitive plates 410 and 412, respectively. The capacitance of the capacitive sensor 400 varies depending on the overlap of the capacitive plates 410 and 412. Other forms of capacitive sensors such as known variable gap capacitive sensors can also be used.

Figure 15:
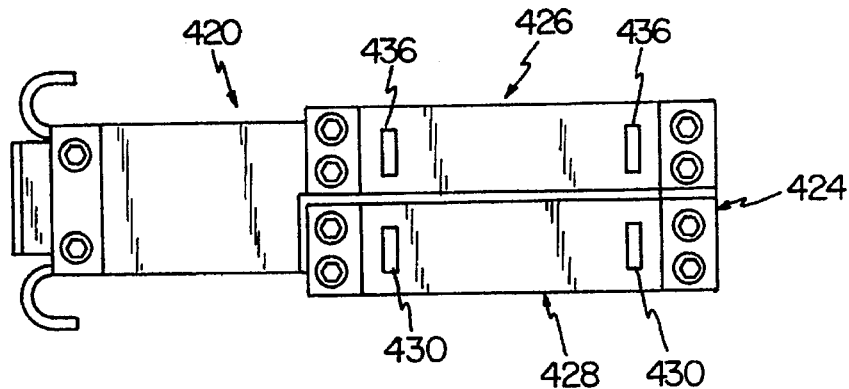
FIG. 15 is a top plan view of a seventh embodiment of the present invention.
Figure 16:
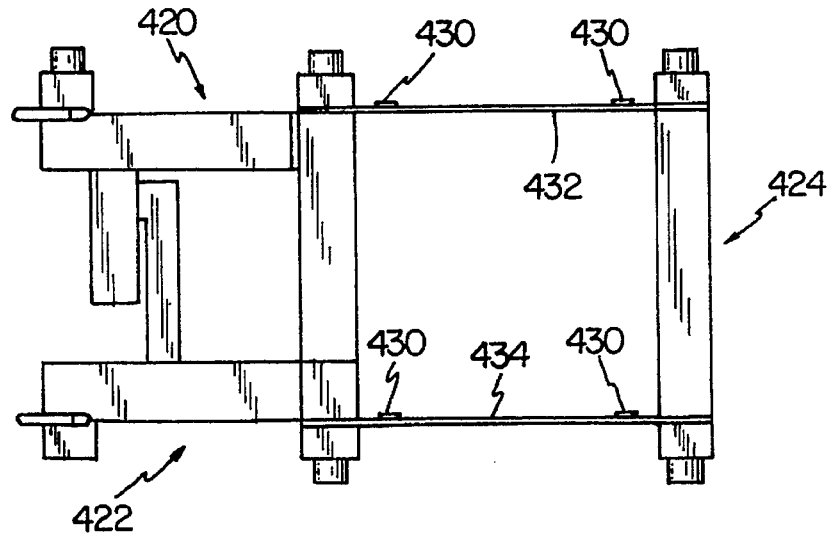
FIG. 16 is a side elevational view of the seventh embodiment.

FIGS. 15 and 16 illustrate another type of sensor that can be used to measure the change in distance between an upper arm assembly 420 and a lower arm assembly 422. The upper arm assembly 420 and the lower arm assembly 422 are joined to a support member 424 using side-by-side flexure assemblies 426 and 428 that are similar to the embodiment illustrated in FIGS. 1–5. In this embodiment, suitable strain gauges 430 are mounted to flexible plates 432 and 434 of the flexure assembly 428. The strain gauges 430 are electrically connected in a known manner to provide a signal representative of a change in distance between the lower flexure assembly 422 and the support member 424. Similarly, strain gauges 436 are mounted to both of the flexible plates of the flexure assembly 426. The strain gauges 436 provide a signal representative of a change in distance between the upper arm assembly 420 and the support member 424. By combining the signals from the strain gauges 430 and 436, a change in distance between the arm assemblies 420 and 422 can be determined.

Figures 17, 18, 19:
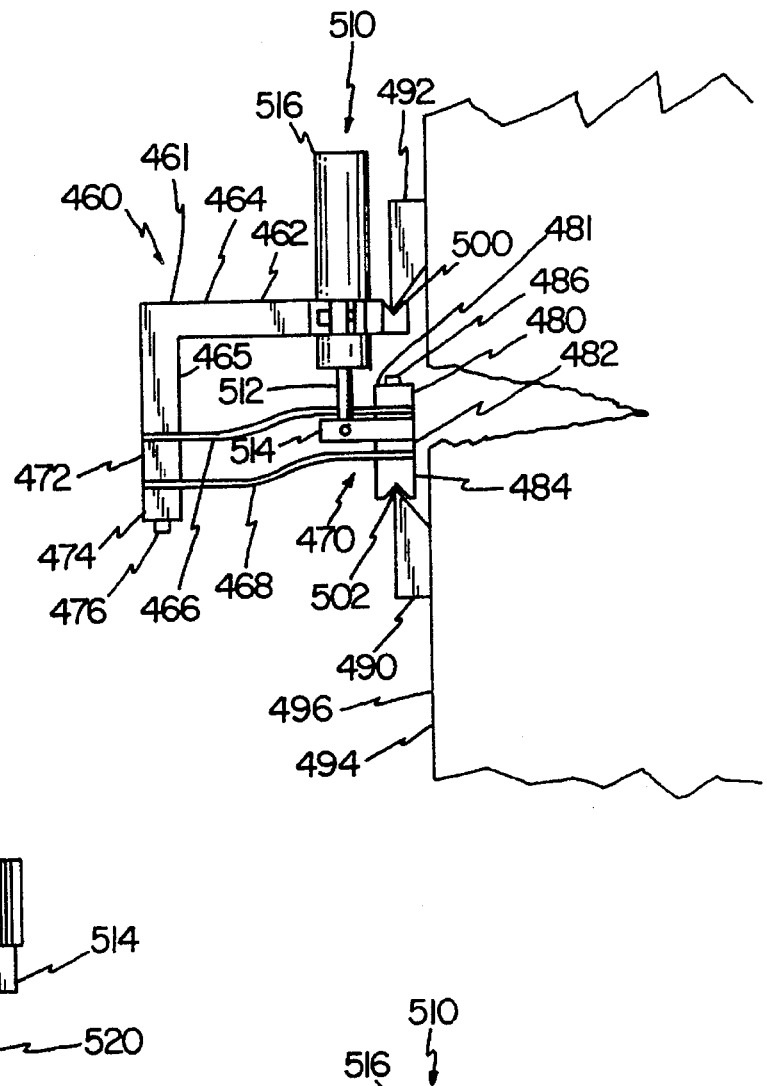
FIG. 17 is a side elevational view of an eighth embodiment of the present invention.
FIG. 18 is a top plan view of the eighth embodiment of the present invention.
FIG. 19 is a side elevational view of the eighth embodiment in a relaxed state.

FIGS. 17 and 18 illustrate another embodiment of an extensometer of the present invention at 460. The extensometer 460 includes a member or arm 462. The arm 462 has a first portion 464 and a second portion 465 substantially perpendicular to the first portion 464. Spaced-apart flexible plates 466 and 468 join the arm 462 to a member indicated at 470. As illustrated, the flexible plate 466 is secured between a block 472 and the portion 465, while the flexible plate 468 is secured between a clamping block 474 and the block 472. Fasteners 476 secures the block 472 to the arm 462 and the clamping block 474 to the block 472 with the flexible plates 466 and 468 secured as shown.

The member 470 comprises a clamping block 480, a center or intermediate block 482 and an end or second clamping block 484. A fastener 486 secures each of the blocks together securing ends of the flexible plates 466 and 468 between the clamping block 480 and the center block 482 and the center block 482 the end block 484, respectively.

The extensometer 460 is particularly well suited for fatigue tests wherein support blocks 490 and 492 are fastened to a surface 494 of a test specimen 496. Each of the support blocks 490 and 492 have an end that is suitable to engage with the arm 462 and the member 470. As illustrated, both the arm 462 and the end block 484 are provided with notches 500 and 502, respectively. In operation, the extensometer 460 is held between the support blocks 490 and 492 due to a spring force generated in the flexible plates 466 and 468 when the member 470 is displaced toward the arm 460. As the test specimen 496 is loaded, the support blocks 490 and 492 will move relative to each other. The member 470 will move relative to the arm 460 with corresponding reference planes, for example, an upper surface 481 of member 470 and an upper surface 461 of arm 460, remaining parallel.

If desired, the spring force can be increased by forming the flexible plates 466 and 468 so that in a relaxed state the member 470 is disposed farther away from the end of the arm 460 as illustrated in FIG. 19. To achieve the configuration of FIG. 19, the flat flexible plates 466 and 468 can be placed in a suitable fixture, not shown, and loaded with a suitable force. By then applying a sufficient quantity of heat, the plates 466 and 468 will bend to the desired angle.

A suitable sensor 510 is provided to measure change in distance between the arm 462 and the member 470. As illustrated, the sensor 510 is an LVDT sensor having a rod assembly 512 that is joined to a support bar 514, which in turn, is joined to the member 470. An outer housing 516 of the sensor 510 is secured to the arm 462 using a split-aperture clamping assembly indicated at 520 in FIG. 18.

It should be understood that other forms of sensors can be used to measure a change in distance between the arm 462 and the member 470. For example, strain gauges can be mounted to the flexible plates 466 and 468 using known techniques. It should also be understood that knife-edge blades can be suitably joined to the arm 462 and the member 470, if desired. Similarly, the flexible plates of the extensometers of FIGS. 1–16 can be formed so that a suitable spring force is present between the upper arm assembly and the support member, and lower arm assembly and the support member, when the arm assemblies are forced toward or away from each other.

Although the present invention has been described with reference to preferred embodiments, workers skilled in the art will recognize that changes may be made in form and detail without departing from the spirit and scope of the invention.

What is claimed is:

1. An extensometer for measuring a change in distance between two points on a surface of a test specimen, comprising:

a first arm having a first end and a second end;

a second arm having a first end and a second end;

means at the first ends of each of the arms for engaging a specimen to be tested;

a support member;

first flexure means connecting the second end of the first arm to the support member, the first flexure means allowing the first arm to move relative to the support member;

second flexure means connecting the second end of the second arm to the support member, the second flexure means being spaced-apart from the first flexure means and allowing the second arm to move relative to the support member; and means for measuring a change in distance between the first and second arms.

2. The extensometer of claim 1 wherein the first flexure means comprises a pair of spaced-apart flexible plates.

3. The extensometer of claim 2 wherein the second flexure means comprises a second pair of spaced apart flexible plates.

4. The extensometer of claim 3 wherein each arm comprises a first portion extending away from the test specimen and a second portion perpendicular to the first portion.

5. The extensometer of claim 4 wherein the second portion of each arm comprises the second end of each corresponding arm.

6. The extensometer of claim 5 wherein the support member comprises a block having two opposed end surfaces wherein a flexible plate from each pair of flexible plates is mounted to each end surface.

7. The extensometer of claim 5 wherein the support member includes two opposed end surfaces and wherein a flexible plate of the first-mentioned pair of flexible plates is joined to one end surface and a flexible plate of the second pair of flexible plates is joined to the other end surface.

8. An extensometer comprising:

a first arm having an end operably couplable to a specimen to be tested;

a second arm having an end operably couplable to the specimen to be tested;

a support member;

a first pair of spaced-apart flexible plates joining the first arm to the support member;

a second pair of spaced-apart flexible plates joining the second arm to the support member; and means for measuring a change in distance between the first and second arms.

9. The extensometer of claim 8 wherein the means for measuring comprises an LVDT sensor.

10. The extensometer of claim 9 wherein the first arm comprises a first portion of the first arm and a second portion of the first arm extending perpendicular from the first portion of the first arm, the first pair of spaced-apart flexible plates being joined to the second portion of the first arm.

11. The extensometer of claim 10 wherein the second arm comprises a first portion of the second arm and a second portion of the second arm extending perpendicular from the first portion of the second arm, the second pair of spaced-apart flexible plates being joined to the second portion of the second arm.

12. The extensometer of claim 10 wherein the second portion of the first arm has a first end surface and a second end surface opposite the first end surface, and wherein a first plate of the first pair of spaced-apart flexible plates is disposed on the first end surface, and wherein a second plate of the first pair of spaced-apart flexible plates is disposed on the second end surface.

13. The extensometer of claim 12 and further comprising a clamping block for clamping the first plate to the first end surface, and a second clamping block for clamping the second plate to the second end surface.

14. The extensometer of claim 13 and further comprising means for removably securing the first and second clamping blocks.

15. The extensometer of claim 8 wherein the means for measuring comprises a first capacitor plate connected to the first arm and a second capacitor plate spaced-apart and facing the first capacitor plate, the second capacitor plate connected to the second arm.

16. The extensometer of claim 8 wherein the means for measuring comprises a plurality of strain sensors wherein a strain sensor is coupled to each flexible plate of the first pair of spaced-apart flexible plates and each flexible plate of the second pair of spaced-apart flexible plates.

17. The extensometer of claim 8 wherein the support member includes a first end surface and a second end surface and wherein one of the flexible plates of the first pair of spaced-apart flexible plates is secured to the first end surface and the other flexible plate of the first pair of spaced-apart flexible plates is secured to the second end surface, and wherein one of the flexible plates of the second pair of spaced-apart flexible plates is secured to the first end surface and the other flexible plate of the second pair of spaced-apart flexible plates is secured to the second end surface.

18. An extensometer for measuring a change in distance between a first support block secured to a surface of a test specimen and a second support block secured to the surface of the test specimen, the extensometer comprising:

- a first member having an end engageable with the first support block;
- a second member having an end engageable with the second support block;
- a pair of spaced-apart flexible plates joining the first member to the second member, the pair of flexible plates generating a force to hold the end of the first member against the first support block and to hold the end of the second member against the second support block; and
- means for measuring a change in distance between the first and second members.

19. The extensometer of claim 18 wherein the first member comprises a first portion having the end engageable with the first support block, and a second portion perpendicular to the first portion, at least one of the pair of spaced-apart flexible plates being mounted to the second portion.

20. The extensometer of claim 19 wherein the second member comprises a block with opposed end surfaces, and the extensometer includes a first clamping block for mounting one of the flexible plates to one of the end surfaces of the block and a second clamping block for mounting the other flexible plate to the other end surface of the block.

21. The extensometer of claim 20 and further comprising an intermediate member joined to an end of the second portion for mounting one of the flexible plates to the end of the second portion and a third clamping block for mounting the other flexible plate to an end of the intermediate block remote from the first-mentioned flexible plate.

* * * * *